ELIZABETH WIGGINS.
SCISSORS-GAGE.

No. 178,093.                    Patented May 30, 1876.

UNITED STATES PATENT OFFICE.

ELIZABETH WIGGINS, OF BROOKLYN, NEW YORK.

IMPROVEMENT IN SCISSORS-GAGES.

Specification forming part of Letters Patent No. 178,093, dated May 30, 1876; application filed May 1, 1876.

*To all whom it may concern:*

Figure 1:
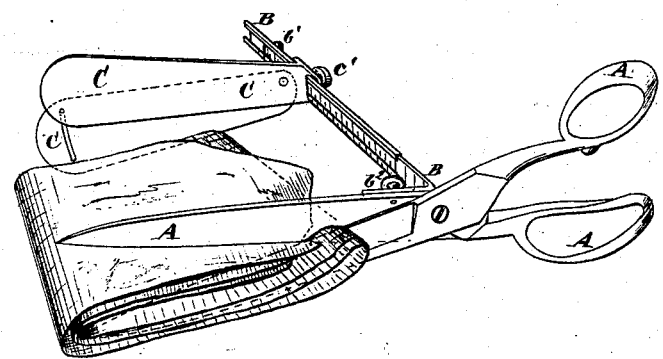
Figure 2:
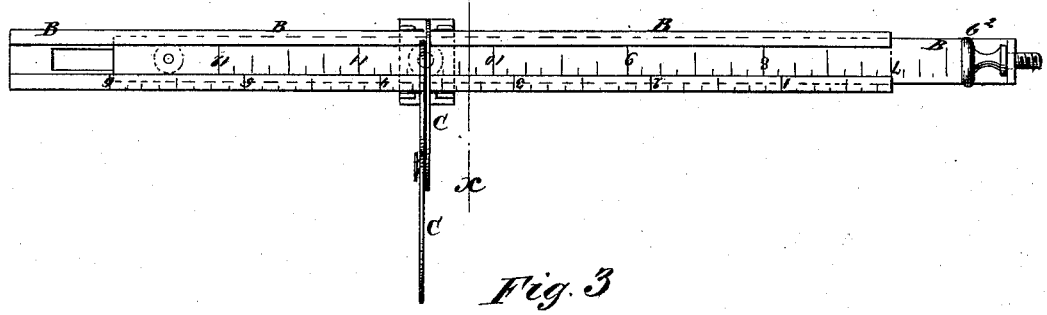
Figure 3:
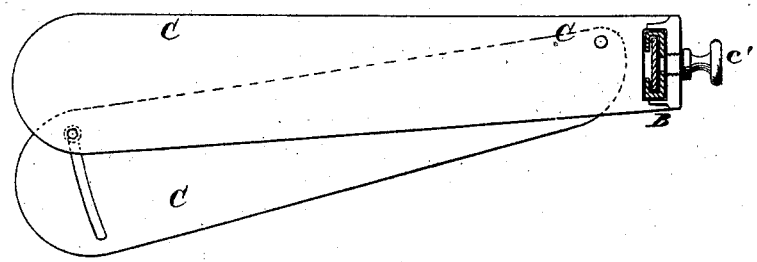

Be it known that I, Mrs. ELIZABETH WIGGINS, of Brooklyn, Kings county, State of New York, have invented a new and Improved Self-Measuring Shear Attachment, of which the following is a specification:

In the accompanying drawing, Figure 1 is a perspective view of my improved device, shown as applied to a pair of shears. Fig. 2 is a front view of the device; and Fig. 3 is a detail cross-section of the same, taken through the line $x\,x$, Fig. 2.

The object of my invention is to furnish an improved device for attachment to shears for cutting bias and straight trimmings, and which will enable the trimmings to be cut much more rapidly and accurately than when cut in the old way.

My invention consists in the extension-arm and the adjustable gage-plate, made in two parts, closing together, in combination with an ordinary shears, as hereinafter fully described.

In the drawing, A represents a pair of shears, to the upper blade of which, near its pivot, is attached the end of an arm, B, which is made in two parts sliding upon each other, and clamped to each other, when adjusted, by a set-screw, $b^1$. The inner end of the inner part of the arm B is bent at right angles, to form a base to rest against the blade of the shears, and has a hole formed through it to receive the screw $b^2$, by which it is secured to the blade of the shears A. Upon the parts of the arm B is formed a scale of inches and fractions of an inch, for convenience in adjusting the gage-plate C. The gage C slides upon the extension-arm B, and is secured in place, when adjusted, by a clamping-screw, C'. The gage-plate C is made in two parts, pivoted to each other near their inner ends, and connected to each other near their outer ends by a pin attached to one of the said parts, and passing through a slot in the other, as shown in Figs. 1 and 3. By this construction, when the blades are closed the two parts of the gage-plate C are closed, and as the blades are opened the lower part remains upon the table, so as to serve as a stop to the goods.

In using the device, the goods are folded evenly, and the gage-plate C is adjusted to the required distance. The lower blade of the shears is then passed beneath the folded goods in such a position that the edge of the goods may rest against the gage-plate C, and the strip is cut off by a single clip of the shears.

Having thus described my invention, what I claim as new, and desire to secure by Letters Patent, is—

The extension-arm B and the adjustable gage-plate C, made in two parts, closing together, in combination with an ordinary shears, substantially as herein shown and described.

ELIZABETH WIGGINS.

Witnesses:
JAMES T. GRAHAM,
T. B. MOSHER.